US009626630B2

(12) United States Patent
Feldman et al.

(10) Patent No.: US 9,626,630 B2
(45) Date of Patent: Apr. 18, 2017

(54) MACHINE LEARNING CUSTOMER VALUATION FUNCTIONS

(71) Applicant: International Business Machines Corporation, Armonk, NY (US)

(72) Inventors: Vitaly Feldman, Palo Alto, CA (US); Jan Vondrak, Stanford, CA (US)

(73) Assignee: International Business Machines Corporation, Armonk, NY (US)

(*) Notice: Subject to any disclaimer, the term of this patent is extended or adjusted under 35 U.S.C. 154(b) by 432 days.

(21) Appl. No.: 14/231,771

(22) Filed: Apr. 1, 2014

(65) Prior Publication Data

US 2015/0278708 A1 Oct. 1, 2015

(51) Int. Cl.
*G06N 99/00* (2010.01)
*H04L 29/08* (2006.01)

(52) U.S. Cl.
CPC .......... *G06N 99/005* (2013.01); *H04L 67/10* (2013.01)

(58) Field of Classification Search
None
See application file for complete search history.

(56) References Cited

U.S. PATENT DOCUMENTS

| 7,702,561 B2 | 4/2010 | Davenport et al. |
| 7,958,006 B2 | 6/2011 | Keil et al. |
| 8,244,562 B2 | 8/2012 | Jain et al. |
| 2002/0118730 A1* | 8/2002 | Svensson ............... G06F 17/15 375/150 |
| 2007/0129981 A1 | 6/2007 | Jang et al. |
| 2011/0099045 A1 | 4/2011 | Carr et al. |
| 2012/0185348 A1 | 7/2012 | Milgrom |
| 2012/0203630 A1 | 8/2012 | Goel |

OTHER PUBLICATIONS

Badanidiyuru et al., "Sketching Valuation Functions", Oct. 4, 2011, 23rd Annual ACM-SIAM Symposium on Discrete Algorithms, SODA 2012, May 2012, Association for Computing Machinery, pp. 1025-1035, Copyright © SIAM.
Feldman et al., "Optimal Bounds on Approximation of Submodular and Xos Functions by Juntas", IBM Research—Almaden, Jul. 13, 2013, <http://arxiv.org/abs/1307.3301v1>, "Grace Period Disclosure".
Feldman et al., "Representation, Approximation and Learning of Submodular Functions Using Low-rank Decision Trees", pp. 1-27, Apr. 3, 2013, <http://arxiv.org/abs/1304.0730>, "Grace Period Disclosure".
Malekian, Azarakhsh, "Combinatorial Problems in Online Advertising", Dissertation submitted to the Faculty of the Graduate School of the University of Maryland, College Park in partial fulfillment of the requirements for the degree of Doctor of Philosophy 2009, pp. 1-98, © Copyright by Azarakhsh Malekian 2009, Dissertations Abstracts International, vol. 7103B, pp. 1817, 2009, USA.

* cited by examiner

*Primary Examiner* — Alan Chen
(74) *Attorney, Agent, or Firm* — Kristofer L. Haggerty

(57) ABSTRACT

A computing device determines one or more first degree correlations based on valuation information. The computing device determines one or more important variables based on at least a comparison between the absolute value of the one or more first degree correlations to a first threshold value. The computing device determines a valuation function based on at least one or more of the determined one or more important variables.

15 Claims, 3 Drawing Sheets

MACHINE LEARNING CUSTOMER VALUATION FUNCTIONS

STATEMENT REGARDING PRIOR DISCLOSURES BY THE INVENTOR OR A JOINT INVENTOR

Various aspects of the present invention have been disclosed by an inventor or a joint inventor in two papers. The first paper is entitled "Representation, Approximation and Learning of Submodular Functions Using Low-rank Decision Trees", made publically available on Apr. 2, 2013 and published in Conference on Learning Theory 2013 (June, 2013). The second paper is entitled "Optimal Bounds on Approximation of Submodular and XOS Functions by Juntas", made publically available on Jul. 12, 2013, and published in Foundation of Computer Science Conference (October, 2013). These disclosures are submitted under 35 U.S.C. 102(b)(1)(A). The following document is provided in support:

Representation, Approximation and Learning of Submodular Functions Using Low-rank Decision Trees, Vitaly Feldman, Pravesh Kothari, and Jan Vondrak, dated Apr. 3, 2013.

Optimal Bounds on Approximation of Submodular and XOS Functions by Juntas, Vitaly Feldman, and Jan Vondrak, dated Jul. 15, 2013.

FIELD OF THE INVENTION

The present invention relates generally to machine learning, and more particularly to, machine learning customer valuation functions based on identifying important variables.

BACKGROUND

Machine learning is a branch of artificial intelligence that concerns the construction and study of systems that can learn from data. Many machine learning problems involve inferring a function from random labeled examples. For example, a machine learning system could be trained on email messages to learn to distinguish between spam and non-spam messages. After learning, it can then be used to classify new email messages into spam and non-spam folders. A focus of machine learning pertains to the concepts of representation and generalization. Representation of data instances and functions evaluated on these instances are part of all machine learning systems. Generalization is the property that the system will perform well on unknown data instances; the conditions under which this can be guaranteed are a key object of study in the subfield of computational learning theory. There are a wide variety of machine learning tasks and applications. For example, optical character recognition, in which printed characters are recognized automatically based on previous examples, is a classic example of machine learning.

SUMMARY

Embodiments of the present invention provide a method, system and computer program product for determining an unknown valuation function. A computing device determines one or more first degree correlations based on valuation information. The computing device determines one or more important variables based on at least a comparison between the absolute value of the one or more first degree correlations to a first threshold value. The computing device determines a valuation function based on at least one or more of the determined one or more important variables.

DETAILED DESCRIPTION

Figure 1:
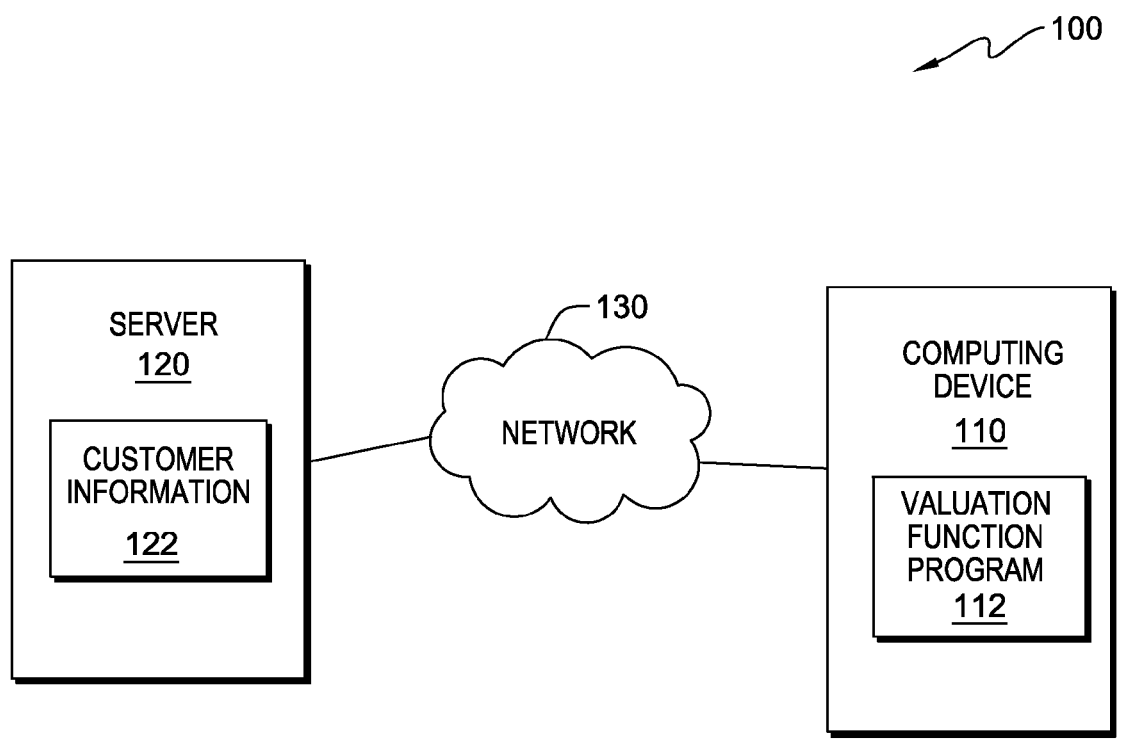
FIG. 1 illustrates a valuation function determination system, in accordance with an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will now be described in detail with reference to the accompanying Figures.

FIG. 1 depicts computing device 110 and server 120 interconnected via network 130, in accordance with an exemplary embodiment of the invention. In the exemplary embodiment, network 130 is the Internet, representing a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols that will support communications between computing device 110 and server 120.

Server 120 includes customer information 122. Social media server 120 may be a remote computer device, desktop computer, a notebook, a laptop computer, a tablet computer, a handheld device, a smart-phone, a thin client, or any other electronic device or computing system capable of receiving and sending data to and from other computing devices, such as computing device 110 via network 130. Although not shown, optionally, Server 120 can comprise a cluster of web servers executing the same software to collectively process the requests for the web pages as distributed by a front end server and a load balancer. In an exemplary embodiment, server 120 is a computing device that is optimized for the support of websites which reside on server 120, such as customer information 122, and for the support of network requests related to websites which reside on server 120. Server 120 is described in more detail with reference to FIG. 3.

In the exemplary embodiment, customer information 122 is data that details information about a group of customers. In the exemplary embodiments, customer information 122 contains only a specific amount of a category of customer information. For example, if the relevant category of customer information is vacation packages, with each vacation package including a combination of attributes (such as a seaside resort, speedboat ride, or turtle hunt), customer information 122 may contain information detailing six vacation packages (each containing a certain combination of attributes), but may not contain information detailing other vacation packages (containing other combinations of attributes). Customer information 122 is described in further detail with regard to FIG. 2.

In the exemplary embodiment, computing device 110 includes valuation function program 112. Computing device 110 may be a desktop computer, a notebook, a laptop computer, a tablet computer, a handheld device, a smart-phone, a thin client, or any other electronic device or computing system capable of executing program instructions and supporting the functionality required of specific embodiments of the invention. The components of computing device 110 are described in more detail with reference to FIG. 3.

Valuation function program 112 is software capable of transmitting and receiving information from other computing devices, such as server 120, via network 130. In the exemplary embodiment, valuation program 122 is capable of identifying important variables for an unknown customer valuation function based on received customer information, where the unknown customer valuation function is either submodular or fractionally subadditive. In the exemplary embodiment, valuation function program 122 is also capable of determining the customer valuation function based on the identified important variables. The operations of valuation function program 122 are described in further detail with regard to FIG. 2.

Figure 2:
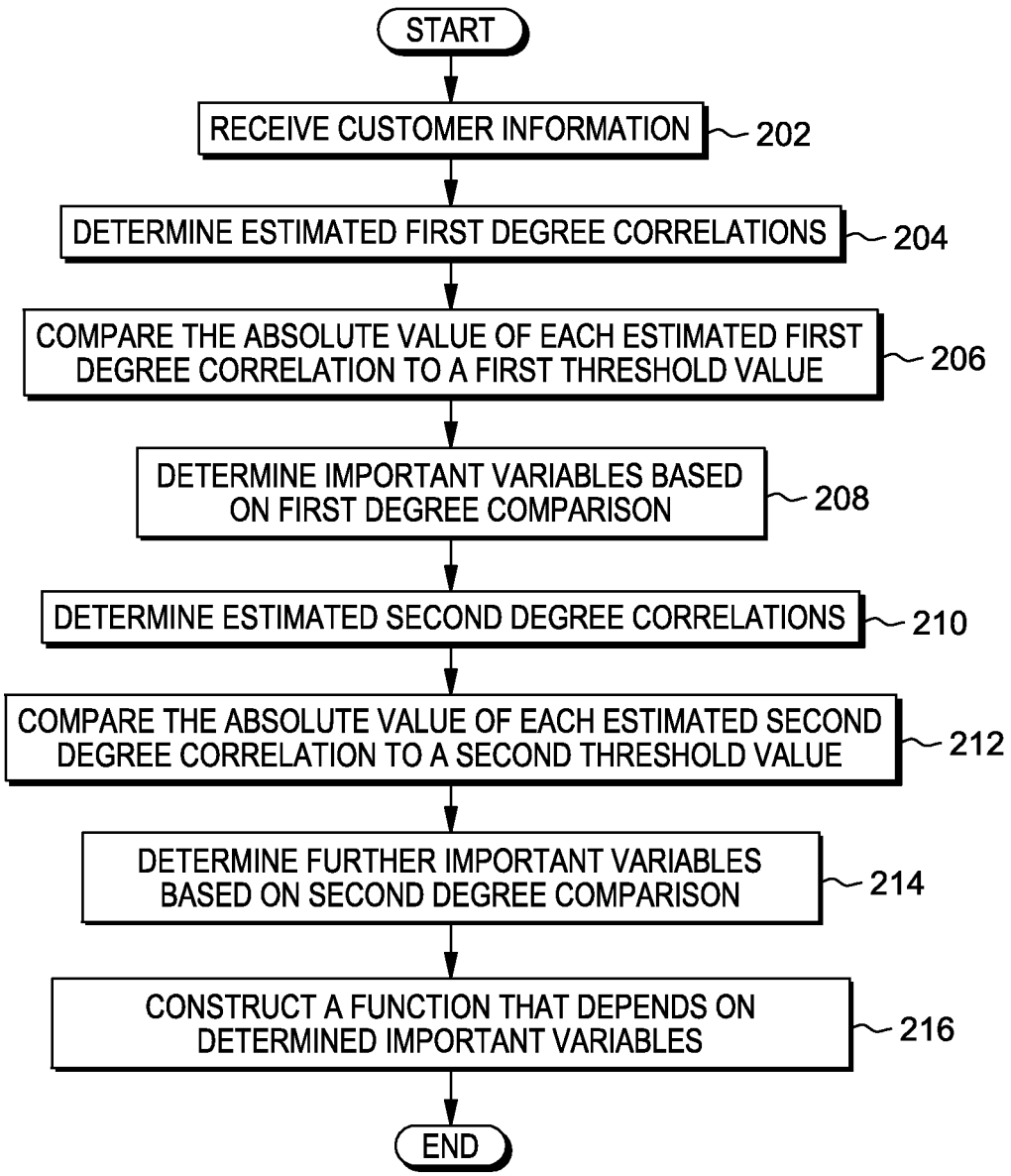
FIG. 2 is a flowchart illustrating the operations of valuation function program of FIG. 1, in accordance with an embodiment of the invention.

FIG. 2 is a flowchart illustrating the operation of valuation function program 122 in identifying important variables for an unknown customer valuation function and determining the customer valuation function based on the identified important variables, where the unknown customer valuation function is either submodular or functionally subadditive, in accordance with an exemplary embodiment of the invention. In an exemplary embodiment, valuation function program 122 receives customer information 122 from server 120 via network 130 (step 202). In the exemplary embodiment, customer information 122 details specific items and how a group of customers value each specific item. For example, customer information 122 may contain attributes of a vacation package, such as, a seaside resort, a speedboat ride, a turtle hunt, a condo time-share presentation, and a spirits bar, along with an associated value for each attribute (and/or combination of attributes) based on how the group of customers value each attribute. In other words, if the following variables represent each attribute: seaside resort ($x_1$), speedboat ride (x2), turtle hunt (x3), condo time-share presentation (x4), and spirits bar (x5), customer information 122 would include a value associated with certain combinations of the vacation package. For example, if v represents the value of each vacation package, customer information 122 may include information that details certain value combinations such as: v(1, 0, 1, 1, 1)=v(seaside resort, turtle hunt, presentation and spirits bar)=$500; v(0, 0, 0, 1, 1)=v (presentation and spirits bar)=$0; v(1, 1, 0, 0, 0)=v(seaside resort and speedboat ride)=$600; v(0, 0, 1, 1, 0, 0)=v(speedboat ride and turtle hunt)=$100; v(1, 0, 1, 0, 1)=v(seaside resort, turtle hunt, and spirits bar)=$550; and v(0, 1, 0, 1, 1)=v(speedboat ride, presentation, and spirits bar)=$50, but may not contain information regarding other combinations such as v(0, 0, 0, 0, 0)=$0; v(1, 0, 0, 0, 0)=v(seaside resort)=$500; v(0, 1, 0, 0, 0)=v(speedboat ride)=$100; v(0, 0, 0, 0, 1)=v(spirits bar)=$0; v(0, 0, 1, 0, 0)=v(turtle hunt) =$50; v(1, 0, 1, 0, 0)=v(seaside resort and turtle hunt)=$550; v(1, 1, 1, 0, 0)=v(seaside resort, speedboat ride, and turtle hunt)=600; v(0, 1, 0, 1, 0)=v (speedboat ride and presentation)=$50; v(1, 1, 0, 1, 0)=v(seaside resort, speedboat ride, and presentation)=$500; v(0, 0, 1, 1, 0)=v(turtle hunt and presentation)=$0; v(1, 0, 1, 1, 0)=v(seaside resort, turtle hunt, and presentation)=$500; v(0, 0, 1, 1, 0)=v(turtle hunt and presentation)=$0; v(1, 0, 1, 1, 0)=v(seaside resort, turtle hunt, and presentation)=$500; v(0, 1, 1, 1, 0)=v(speedboat ride, turtle hunt, and presentation)=$50; v(1, 1, 1, 1, 0)=v (seaside resort, speedboat ride, turtle hunt, and presentation) =$500.

As shown above, attributes may be given a certain value alone or in one combination, and a different value in another combination. For example, the turtle hunt alone is value by customers at $50; however, the turtle hunt in combination with the presentation, or in combination with the seaside resort and speedboat ride, is valued at $0. In addition, attributes, such as the presentation, may also add negative value to a combination.

Valuation function program 122 then determines estimated first degree correlations in order to determine the important variables (step 204). In the exemplary embodiment, first degree correlations are performed by using the equation described below:

$$c_i = \frac{1}{n}\sum_{j}^{n}(2x_i^j - 1)\cdot y^j$$

For example, utilizing the variables defined above, as described above, if customer information 122 includes v(1, 0, 1, 1, 1)=v(seaside resort, turtle hunt, presentation and spirits bar)=$500; v(0, 0, 0, 1, 1)=v(presentation and spirits bar)=$0; v(1, 1, 0, 0, 0)=v(seaside resort and speedboat ride)=$600; v(0, 1, 1, 0, 0)=v(speedboat ride and turtle hunt)=$100; v(1, 0, 1, 0, 1)=v(seaside resort, turtle hunt, and spirits bar)=$550; and v(0, 1, 0, 1, 1)=v(speedboat ride, presentation, and spirits bar)=$50, valuation function program 122 determines the estimated first degree correlations by performing the following equation:

$$c_i = \frac{1}{6}\sum_{j=1}^{6}(2x_i^j - 1)\cdot y^j$$

The six combinations provided above in customer information 122 are denoted by $f(x^1)=y^1, \ldots, f(x^6)=y^6$, where $x^j$ is an assignment to the attributes and $y^j$ is the corresponding value. Since six combinations were provided above in customer information 122, in this example, j is a value from 1 to 6. In other words, j is a value which refers to a specific combination, such as, if j=3, j refers to the combination v(1, 1, 0, 0, 0) which has an associated value (y) of $600, and therefore $y^3$=$600. In addition, n is equal to the number of input combinations (combination functions), which in this case is 6, while i is a value which refers to a specific attribute within a combination. For example, for $x_i^j$ where j=2, and i=4, is equal to 1 ($x_4^2$=1). In other words, $x_4^2$ refers to the fourth attribute of the second combination, v(0, 0, 0, 1, 1), which is equal to 1. In addition, $c_i$ represents the first degree correlation of a variable. In the example described above, $c_1$ represents the first degree correlation for the seaside resort, $c_2$ represents the first degree correlation for the speedboat ride, $c_3$ represents the first degree correlation for the turtle hunt, $c_4$ represents the first degree correlation for the presentation, while $c_5$ represents the first degree correlation for the spirits bar. The first degree correlations can be utilized to determine which variables are important variables, as described further below.

Calculating the first degree correlation for the example where the six combinations described are provided in customer information 122 is performed in the manner shown below: For i=1:

$$c_I = \frac{1}{6}\sum_{j=1}^{6}(2x_1^j - 1)\cdot y^j = \frac{1}{6}[(2x_1^1 - 1)\cdot y^1 + (2x_1^2 - 1)\cdot y^2 + (2x_1^3 - 1)\cdot y^3 +$$

-continued
$$(2x_1^4 - 1) \cdot y^4 + (2x_1^5 - 1) \cdot y^5 + (2x_1^6 - 1) \cdot y^6)] =$$
$$\frac{1}{6}[500 + 0 + 600 + (-100) + 550 + (-50)] = \$250$$

The calculations for i=2, i=3, i=4, and, i=5 are performed in the same manner as described above, and for the example described above yield: $c_1$=$250, $c_2$=−$50, $c_3$=$700/6, =−$70016, and $c_5$=−$40016.

Valuation function program 122 then compares the absolute value of each estimated first degree correlation to a first threshold value (step 206) in order to determine the important variables (step 208). In the exemplary embodiment, the first threshold value is 100; however, in other embodiments, the first threshold value may be another value. Referring back to the example presented above, comparing the absolute value of each of the calculated first degree correlations $c_1$, $c_2$ $c_3$, $c_4$, and $c_5$ to 100, valuation function program 122 determines that $x_1$, $x_3$, and $x_4$ are important variables.

Valuation function program 122 then determines the estimated second degree correlations in order to determine if any other variables are important (step 210). In the exemplary embodiment, the second degree correlation is determined by utilizing the equation below for every pair of variables $x_j$, $x_k$ with j≠k $$c_{i,k} = \frac{1}{n} \sum_{j}^{n} (2x_i^j - 1)(2x_k^j - 1) \cdot y^j$$

In the equation above, $c_{i,j}$ represents the second degree correlation for a pair of variables j and k, while all the other variables are as described above with regards to the first degree correlation discussion. For example, referring to the example presented above, for i=2, and k=3, a second degree correlation can be performed as shown below:

$$c_{2,3} = \frac{1}{6} \sum_{j=1}^{6} (2x_2^j - 1)(2x_3^j - 1) \cdot y^j =$$
$$\frac{1}{6}[(2x_2^1 - 1)(2x_3^1 - 1) \cdot y^1 + (2x_2^2 - 1)(2x_3^2 - 1) \cdot y^2 +$$
$$(2x_2^3 - 1)(2x_3^3 - 1) \cdot y^3 + (2x_2^4 - 1)(2x_3^4 - 1) \cdot y^4 +$$
$$(2x_2^5 - 1)(2x_3^5 - 1) \cdot y^5 + (2x_2^6 - 1)(2x_3^6 - 1) \cdot y^6)] =$$
$$\frac{1}{6}[(-500) + 0 + (-600) + (100) + (-550) + (-50)] =$$
$$-\$1600/6$$

The second degree correlations for other variable combinations (with i being a value between 1 and 5 and k being a value between 1 and 5) may be calculated in a similar manner as described above.

Second degree correlations can help measure how much different pairs of attributes affect each other, such as, how much the presence of a speedboat ride affects the value of a turtle hunt. If a second degree correlation is a large value, then the variables are important.

Valuation function program 122 then compares the absolute value of each estimated second degree correlation to a second threshold value (step 212) and determines if there are any further important variables (step 214). In the exemplary embodiment, the second threshold value is 150; however, in other embodiments, the second threshold value may be the same as the first threshold value or another value. Referring back to the example presented above, comparing the absolute value of each of the calculated second degree correlations to 150, valuation function program 122 determines additional important variables along with the important variables $c_1$, $c_3$, and $c_4$ determined by utilizing the first degree correlation comparison. For example, valuation function program 122 compares the absolute value of the second degree correlation $c_{2,3}$, which is 1600/6, to 150, and determines that $x_2$ is also an important variable. Valuation function program 122 also compares the absolute value of other second degree correlations to the second threshold value to determine if any other variables are important in the same manner.

Valuation function program 122 then constructs a function that depends on the determined important variables (step 216). In the exemplary embodiment, given a set of important variables determined as described above, valuation function program 122 can construct a function that depends on these variables by way of polynomial regression, or in other words, by finding a polynomial of a certain degree over the important variables which fits the information in customer information 122. For example, referring to the example above, if valuation program 122 determines that $x_1$, $x_2$, $x_3$, and $x_4$ are important variables, valuation program 122 constructs a function for all five variables that depends only on $x_1$, $x_2$, $x_3$, and $x_4$ as shown below:

$$g(x_1, x_2, x_3, x_4, x_5) = 500x_1 + 100x_2 + 50x_3 - 50x_2x_3 - 50x_1x_4 - 50x_2x_4$$

In the exemplary embodiment, the linear terms express the standalone value of each attribute, and the quadratic terms express some amount of cancellation between different attributes. The polynomial detailed above fits the values of the vacation package described in the example above on all six value points (six value points corresponding to vacation package combinations detailed in customer information 122). In the exemplary embodiment, the polynomial may not fit the function $g(x_1, x_2, x_3, x_4, x_5)$ everywhere (for example v(0, 0, 1, 1, 0)=0 whereas g(0, 0, 1, 1, 0)=50)); however, the polynomial fits the functions closely on almost all points.

In other embodiments, valuation function program 122 may further use additive approximation, multiplicative approximation and recursive branching in determining one or more customer valuation functions. In this other embodiment, multiplicative approximation, with an accuracy parameter 1+γ and a failure probability δ, is a function (referred to hereinafter as equation 1):

$$v(x) \text{ where: } v(x) \leq g(x) \text{ and } g(x) \leq (1+\gamma)v(x) \text{ for a } (1-\delta)$$
fraction of the points x.

In this other embodiment, for γ=1% the result is a function g(x) that is at least as large as the valuation function v(x) and not larger than 101% of v(x). In further embodiments, γ may be a different value. In addition, in this other embodiment, δ is 1%, however, in further embodiments, δ may be another value. The use of multiplicative approximation is discussed in further detail below.

In this other embodiment, valuation function program 122 may further reduce the set of variables (J) that the valuation function depends on, (i.e., important variables—$x_1$, $x_2$, $x_3$, $x_4$), by trying all subsets of some size k. The value of k is determined based on a desired error value input by a user of computing device 110. More specifically, based on a desired error value, ε, input by the user of computing device 110 via a user interface, k is determined by utilizing the following equation:

$$k = O\left(\frac{1}{\varepsilon^2}\log\frac{1}{\varepsilon}\right),$$

with ε=γδ and O being a constant factor

For example, referring to the example above, where the determined important variables were $x_1$, $x_2$, $x_3$, $x_4$, or in other words, J=(1, 2, 3, 4), and with k=2, valuation function program 122 determines a valuation function for each 2 variable subset (because k=2, although, in other embodiments k may be a different value), using polynomial regression as described above. Therefore, referring to the example, valuation function program 122 utilizes polynomial regression to determine the valuation function, a polynomial, (referred to as $g_{J'}(x)$) that best fits each of the following subsets (hereinafter J' refers to a subset): (1, 2), (1, 3), (1, 4), (2, 3), (2, 4), and (3, 4). In other words, valuation function program 122 utilizes polynomial regression to determine a polynomial for each subset that depends only on the variables contained in the subset. For example, valuation function program may utilize polynomial regression to determine the following polynomial for J'=(1, 3): $g_{(1,3)}(x)=500x_1+50x_3$.

Once a polynomial is determined for each subset, valuation function program 122 determines the subset/polynomial which has the lowest additive approximation error. For example, for the subset J'=(1, 3), valuation function program 122 determines the additive approximation error by calculating the value of $g_{(1,3)}(x)=500x_1+50x_3$ for each of the six value combinations contained in customer information 122 and comparing each determined value to the value described in customer information 122. In other words, for the value combination v(1, 0, 1, 1, 1)=500, valuation function program 122 determines that $g_{(1,3)}(x)=500x_1+50x_3=500(1)+50(1)=550$. Valuation function program 122 then determines an additive approximation error for the value combination (with regard to the subset), by comparing 550 to the value given in customer information 122, i.e., 500. This represents an additive approximation error of 50. Valuation function program 122 determines the additive approximation error for all other value combinations for the subset J'=(1, 3), and averages the determined additive approximation errors together in order to determine the additive approximation error for the subset. Valuation function program 122 determines the additive approximation error for the other subsets in a similar manner and determines the subset with the lowest additive approximation error. In further embodiments, valuation function program 122 may compare the additive approximation error (determined in percentage form based on comparison with actual values) of a subset to ε, in order to determine an appropriate subset. In this further embodiment, if valuation function program 122 determines that the additive approximation error for a subset is below ε, valuation function program 122 determines the subset is appropriate to utilize in the next step.

In this other embodiment, valuation function program 122 determines whether the multiplicative approximation error is acceptable for each variable combination contained in the subset determined to have the lowest additive approximation error. Determining whether the multiplicative approximation error is acceptable for each variable combination contained in a subset involves two steps. First, valuation function program 122 determines whether v(x) where: $v(x) \le g_{J'}(x)$ and $g_{J'}(x) \le (1+\gamma)v(x)$ (with γ=1% and δ=1%), equation 1, holds true for the each unique value combination contained in each of the variable combinations of the subset. Second, valuation function program 122 determines whether an adequate percentage of the value combinations contained in each variable combination, that satisfy equation 1, is above a threshold value. In this other embodiment, the percentage is 99%, however, in another embodiment, the percentage may be a different value. If valuation function program 122 determines that an adequate percentage of the value combinations contained in each variable combination that satisfy equation 1, is above the threshold value, valuation function program 122 determines that the polynomial for the subset, is an accurate predictor (valuation function) for the relevant variable combination of the subset. If valuation function program 122 determines that an adequate percentage of the value combinations contained in each variable combination that satisfy equation 1, is below the threshold value, valuation function program 122 utilizes recursive branching techniques and performs the algorithm described in FIG. 2 for all value combinations, where the multiplicative approximation error is determined to be too large, of the relevant variable combination of the subset.

For example, if valuation function program 122 determines that the subset J'=(1, 3) has the lowest additive approximation error, valuation function program determines whether the multiplicative approximation error for each variable combination contained in the subset is acceptable. J'=(1, 3) represents the seaside resort and turtle hunt with the possible variable combinations including: [00]=no seaside resort and no turtle hunt; [10]=seaside resort but no turtle hunt; [11]=seaside resort and turtle hunt; and [01]=turtle hunt but no seaside resort. For a variable combination x let $S_{J'x}$ be the set of all the given value combinations which have that particular variable combination x and any other value (0 or 1) of all other variables. For the variable combination [00], valuation function program 122 examines all value combinations that exclude the seaside resort and exclude the turtle hunt and determines whether the value of $g_{J'}(x)$ for the each value combination satisfies equation 1. For example, $S_{(1,3),00}$ only contains one value combination v(x)=v(0, 0, 0, 1, 1)=0, as described above. For this example, valuation function program 122 determines whether the value of $g_{(1,3)}$, (00) falls between 0, which represents v(x), and 0, which represents (1+γ)*v(x). Referring to the example above, where, for J'=(1, 3), valuation function program 122 determined that $g_{(1,3)}(x)=500x_1+50x_3$, valuation function program determines that $g_{(1,3)}(00)=0$, therefore, valuation function program 122 determines that equation 1 is satisfied. In addition, since the only value combination contained in the variable combination[00] satisfies equation one, 100% of the value combinations contained in the variable combination [00] satisfy equation 1, which is above the threshold value of 99%, and therefore the multiplicative approximation error for this variable combination is acceptable and the determined polynomial, $g_{(1,3)}(x)=500x_1+50x_3$, is an accurate predictor (valuation function) for the variable combination [00] of the subset (1, 3).

For the variable combination [01], $S_{(1,3),01}$ contains the value combination v(x)=v(0, 1, 1, 0, 0)=100, as described above, (although this variable combination also contains several other value combinations). For this example, valuation function program 122 determines whether the value of $g_{(1,3)}(01)$ falls between 100, which represents h(x), and 101, which represents (1+γ)*h(x). Utilizing the previously determined polynomial, $g_{(1,3)}(x)=500x_1+50x_3$, valuation function program 122 determines that $g_{(1,3)}$, (01)=50, which does not satisfy equation 1 and represents a large multiplicative approximation error (50%). Valuation function program 122 then determines whether the other value combinations contained in the variable combination [01] satisfy equation 1 in the same manner as described above. In this example, since there are only a small number of value combination in each variable combination, if one value combination does not satisfy equation 1, then the percentage of value combinations that satisfy equation 1 will not be above the threshold value, therefore, if one value combination does not satisfy equation 1, it is not necessary for valuation function program 122 to determine whether every other value combination satisfies equation 1. However, in other cases where there are hundreds or thousands of value combinations contained in a variable combination, value function program 122 determines whether each value combination satisfies equation 1, and then determines whether the percentage of value combinations that satisfy equation 1 is above a threshold value.

In this example, since an adequate percentage of value combinations in the variable combination[01] do not satisfy equation 1, valuation function program 122 utilizes recursive branching techniques and performs the algorithm described in FIG. 2 for all value combinations of variable combination[01], with regard to subset (1, 3). In other words, valuation function program 122 utilizes the algorithm described in FIG. 2 to determine the important variables based on all value combinations where $x_1=0$ and $x_3=1$ (only one value combination where this is the case). By way of performing the algorithm of FIG. 2 for this information, valuation function may identify a third important variable, $x_2$, and utilize polynomial regression to produce the polynomial that fits the determined important variables, such as $g_{(1,3)}(X)=500x_1+50x_2+50x_3$ and determine if that satisfies equation 1. Since $g_{(1,3)}$, (01)=100 for this new polynomial, valuation function program 122 determines that multiplicative approximation error is acceptable.

In this other embodiment, valuation function program 122 repeats the same process for each of the variable combinations of the subset until each variable combination of the subset is represented by a polynomial with an acceptable multiplicative approximation error.

In further embodiments, valuation function program 122 may perform the steps of this other embodiment, as described above, without reducing the number of important variables based on the value of k. In addition, in further embodiments, the recursive execution may be limited by a parameter, $$d_{max} = O\left(\log\frac{1}{\delta}\right)$$

defined by a user of computing device 110. In other words, there may be a level beyond which valuation function program 122 does not continue recursively and just outputs value 0 instead. For example, a variable combination may have numerous value combinations, and if valuation function program 122 is not able to find a value combination that satisfies equation 1 after a large number of attempts, described by the parameter $d_{max}$, valuation function program 122 may stop recursively performing the algorithm of FIG. 2 and instead just output a value of 0. In this further embodiment, the value of the parameter $d_{max}$ as described above as a way that ensures that the limit has little effect on the quality of the prediction and at the same time does not force valuation function program 122 to run too long.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
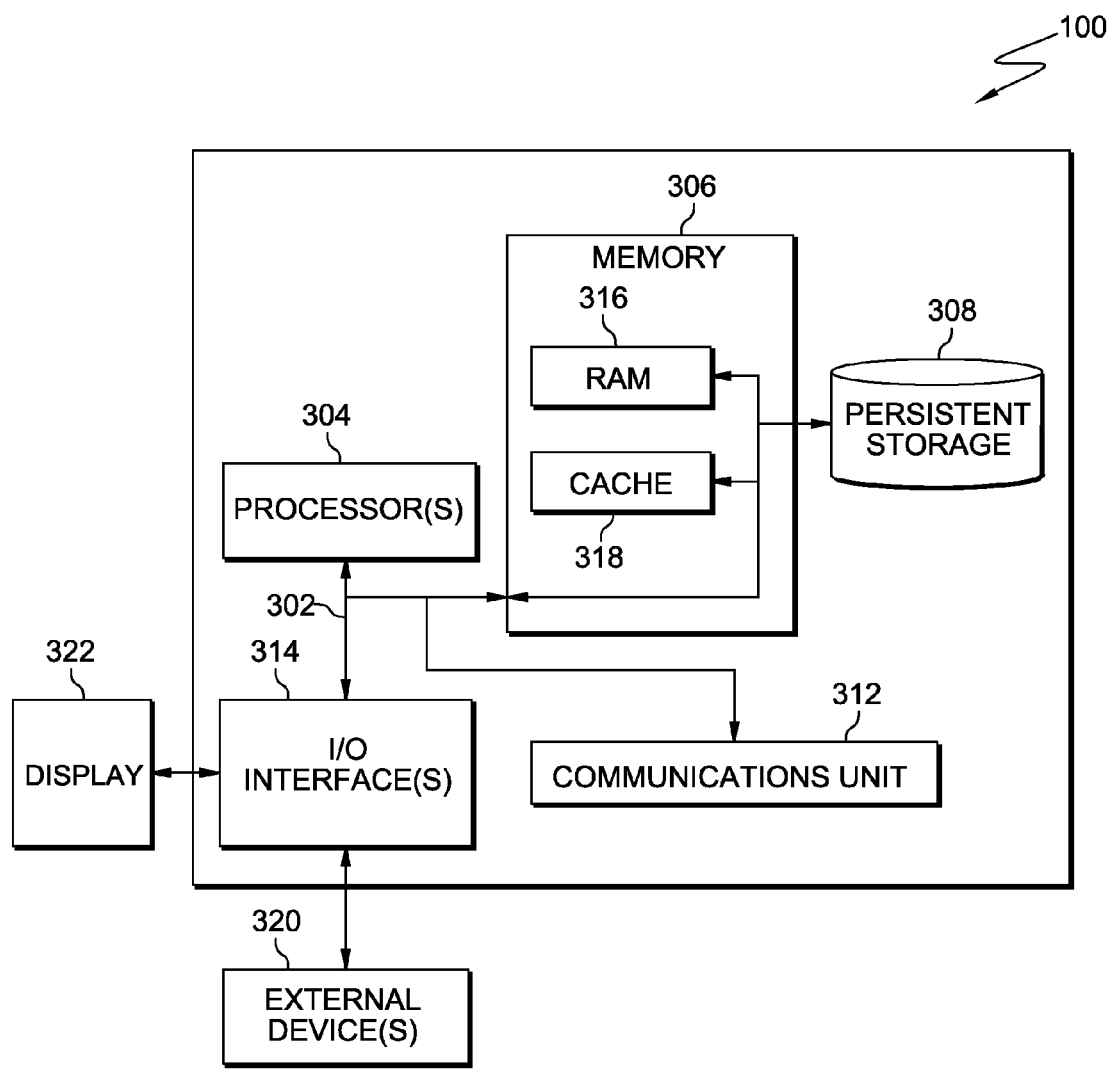
FIG. 3 is a block diagram depicting the hardware components of the valuation function determination system of FIG. 1, in accordance with an embodiment of the invention.

FIG. 3 depicts a block diagram of components of computing device 110 and server 120, in accordance with an illustrative embodiment. It should be appreciated that FIG. 3 provides only an illustration of one implementation and does not imply any limitations with regard to the environment in which different embodiments may be implemented. Many modifications to the depicted environment may be made.

Computing device 110 and server 120 includes communications fabric 302, which provides communications between computer processor(s) 304, memory 306, persistent storage 308, communications unit 312, and input/output (I/O) interface(s) 314.

Memory 306 and persistent storage 308 are examples of computer-readable tangible storage devices and media. Memory 306 may be, for example, one or more random access memories (RAM) 316, cache 318, or any other suitable volatile or non-volatile storage device.

Programs, such as valuation function program 112 in computing device 110 and customer information 122 in server 120, are stored in persistent storage 308 for execution by one or more of the respective computer processors 304 via one or more memories of memory 306. In the embodiment illustrated in FIG. 3, persistent storage 308 includes flash memory. Alternatively, or in addition to flash memory, persistent storage 308 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 308 may also be removable. For example, a removable hard drive may be used for persistent storage 308. Other examples include an optical or magnetic disk that is inserted into a drive for transfer onto another storage device that is also a part of persistent storage 308, or other removable storage devices such as a thumb drive or smart card.

Communications unit 312, in these examples, provides for communications with other data processing systems or devices. In these examples, communications unit 312 includes one or more network interface cards. Communications unit 312 may provide communications through the use of either or both physical and wireless communications links. Programs, such as valuation function program 112 in computing device 110 and customer information 122 in server 120, may be downloaded to persistent storage 308 through communications unit 312.

I/O interface(s) 314 allows for input and output of data with other devices that may be connected to computing device 110. For example, I/O interface 314 may provide a connection to external devices 320 such as a keyboard, keypad, a touch screen, and/or some other suitable input device. I/O interface(s) may also connect to display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining an unknown valuation function, comprising the steps of:
   a computing device determining one or more first degree correlations based on valuation information;
   the computing device determining one or more important variables based on at least a comparison between an absolute value of the one or more first degree correlations and a first threshold value;
   the computing device determining one or more subsets of the determined one or more important variables, wherein each of the one or more subsets includes one or more variable combinations;
   the computing device determining that a first subset of the one or more subsets has a lowest additive approximation error among the one or more subsets;
   the computing device determining a multiplicative approximation error for each variable combination of the first subset;
   based on determining that the one or more variable combinations of the first subset have the acceptable multiplicative approximation error, the computing device determining a valuation function based on at least the first subset, wherein the valuation function is applicable to the one or more variable combinations of the first subset that have an acceptable multiplicative error.

2. The method of claim 1, further comprising:
   the computing device determining one or more second degree correlations based on the valuation information; and
   the computing device comparing the absolute value of the one or more second degree correlations to a second threshold value;
   and wherein the step of determining one or more important variables is based on at least comparing the absolute value of the one or more first degree correlations to a first threshold value and comparing the absolute value of the one or more second degree correlations to a second threshold value.

3. The method of claim 1, further comprising:
   based on determining that no variable combinations of the first subset have the acceptable multiplicative approximation error, the computing device determining a first group of important variables of the determined one or more important variables for the first set of variable combinations;
   the computing device determining a polynomial that fits the first group of important variables; and
   based on the computing device determining that the multiplicative approximation error for the first group of important variables is acceptable, the computing device determining the valuation function based on the polynomial determined to fit the first group of important variables, wherein the valuation function is applicable for the first group of variable combinations.

4. The method of claim 3, further comprising:
   the computing device determining a polynomial for each subset of the one or more subsets, wherein the polynomial for each subset is determined based on the determined one or more important variables contained in the subset; and wherein determining a multiplicative approximation error for each variable combination of the first subset is based on the determined polynomial for the first subset.

5. The method of claim 1, wherein determining one or more subsets of the determined one or more important variables is based on a desired error value.

6. A computer program product for determining an unknown valuation function, the computer program product comprising:
   one or more computer-readable storage devices and program instructions stored on at least one of the one or more tangible storage devices, the program instructions comprising:
   program instructions to determine one or more first degree correlations based on valuation information;
   program instructions to determine one or more important variables based on at least a comparison between an absolute value of the one or more first degree correlations and a first threshold value;
   program instructions to determine one or more subsets of the determined one or more important variables, wherein each of the one or more subsets includes one or more variable combinations;
   program instructions to determine that a first subset of the one or more subsets has a lowest additive approximation error among the one or more subsets;
   program instructions to determine a multiplicative approximation error for each variable combination of the first subset;
   based on determining that the one or more variable combinations of the first subset have the acceptable multiplicative approximation error, program instructions to determine a valuation function based on at least the first subset, wherein the valuation function is applicable to the one or more variable combinations of the first subset that have an acceptable multiplicative error.

7. The computer program product of claim 6, further comprising:
   program instructions to determine one or more second degree correlations based on the valuation information; and program instructions to compare the absolute value of the one or more second degree correlations to a second threshold value;

and wherein the program instructions to determine one or more important variables is based on at least comparing the absolute value of the one or more first degree correlations to a first threshold value and comparing the absolute value of the one or more second degree correlations to a second threshold value.

8. The computer program product of claim 6, further comprising:

based on determining that no variable combinations of the first subset have the acceptable multiplicative approximation error, the computing device determining a first group of important variables of the determined one or more important variables for the first set of variable combinations;

program instructions to determine a polynomial that fits the first group of important variables; and based on the computing device determining that the multiplicative approximation error for the first group of important variables is acceptable, program instructions to determine the valuation function based on the polynomial determined to fit the first group of important variables, wherein the valuation function is applicable for the first group of variable combinations.

9. The computer program product of claim 8, further comprising:

program instructions to determine a polynomial for each subset of the one or more subsets, wherein the polynomial for each subset is determined based on the determined one or more important variables contained in the subset; and wherein determining a multiplicative approximation error for each variable combination of the first subset is based on the determined polynomial for the first subset.

10. The computer program product of claim 6, wherein the program instructions to determine one or more subsets of the determined one or more important variables is based on a desired error value.

11. A computer system for determining an unknown valuation function, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to determine one or more first degree correlations based on valuation information;

program instructions to determine one or more important variables based on at least a comparison between an absolute value of the one or more first degree correlations and a first threshold value;

program instructions to determine one or more subsets of the determined one or more important variables, wherein each of the one or more subsets includes one or more variable combinations;

program instructions to determine that a first subset of the one or more subsets has a lowest additive approximation error among the one or more subsets;

program instructions to determine a multiplicative approximation error for each variable combination of the first subset;

based on determining that the one or more variable combinations of the first subset have the acceptable multiplicative approximation error, program instructions to determine a valuation function based on at least the first subset, wherein the valuation function is applicable to the one or more variable combinations of the first subset that have an acceptable multiplicative error.

12. The computer system of claim 11, further comprising:

program instructions to determine one or more second degree correlations based on the valuation information; and program instructions to compare the absolute value of the one or more second degree correlations to a second threshold value;

and wherein the program instructions to determine one or more important variables is based on at least comparing the absolute value of the one or more first degree correlations to a first threshold value and comparing the absolute value of the one or more second degree correlations to a second threshold value.

13. The computer system of claim 11, further comprising:

based on determining that no variable combinations of the first subset have the acceptable multiplicative approximation error, the computing device determining a first group of important variables of the determined one or more important variables for the first set of variable combinations;

program instructions to determine a polynomial that fits the first group of important variables; and based on the computing device determining that the multiplicative approximation error for the first group of important variables is acceptable, program instructions to determine the valuation function based on the polynomial determined to fit the first group of important variables, wherein the valuation function is applicable for the first group of variable combinations.

14. The computer system of claim 13, further comprising:

program instructions to determine a polynomial for each subset of the one or more subsets, wherein the polynomial for each subset is determined based on the determined one or more important variables contained in the subset; and wherein determining a multiplicative approximation error for each variable combination of the first subset is based on the determined polynomial for the first subset.

15. The computer system of claim 11, wherein the program instructions to determine one or more subsets of the determined one or more important variables is based on a desired error value.

* * * * *